Oct. 4, 1955    J. H. FRIEDMAN    2,719,618
FLUID PRESSURE CONTROL APPARATUS FOR METAL WORKING MACHINES
Filed Sept. 19, 1952    5 Sheets-Sheet 1
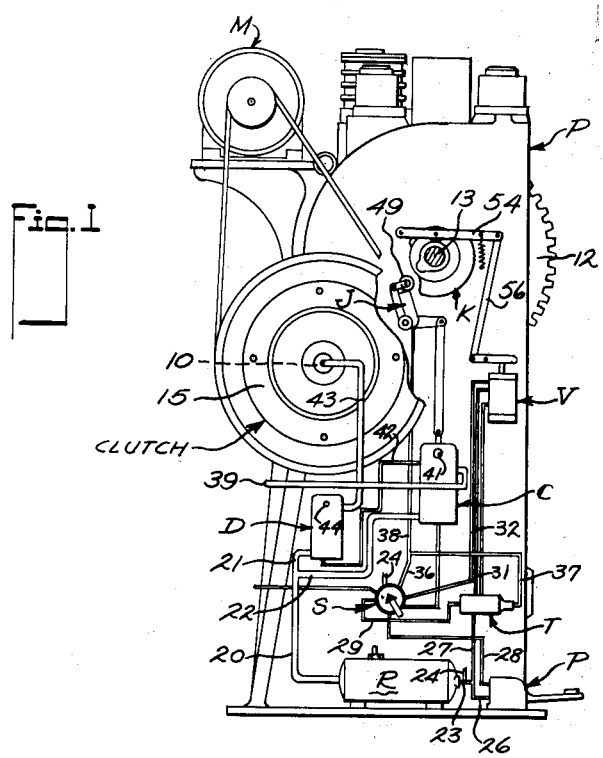
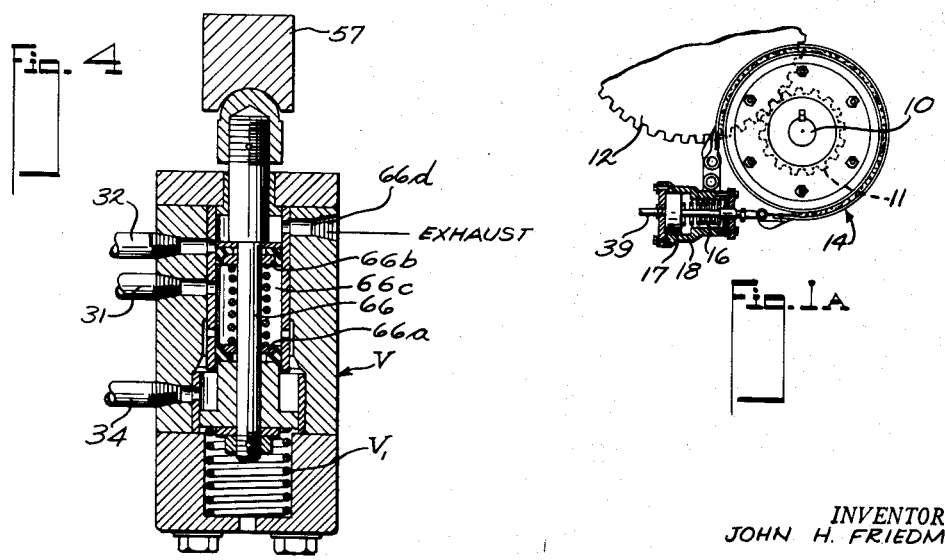
INVENTOR.
JOHN H. FRIEDMAN
BY
RICHEY, WATTS, EDGERTON & McNENNY
ATTORNEYS Oct. 4, 1955   J. H. FRIEDMAN   2,719,618
FLUID PRESSURE CONTROL APPARATUS FOR METAL WORKING MACHINES
Filed Sept. 19, 1952   5 Sheets-Sheet 2
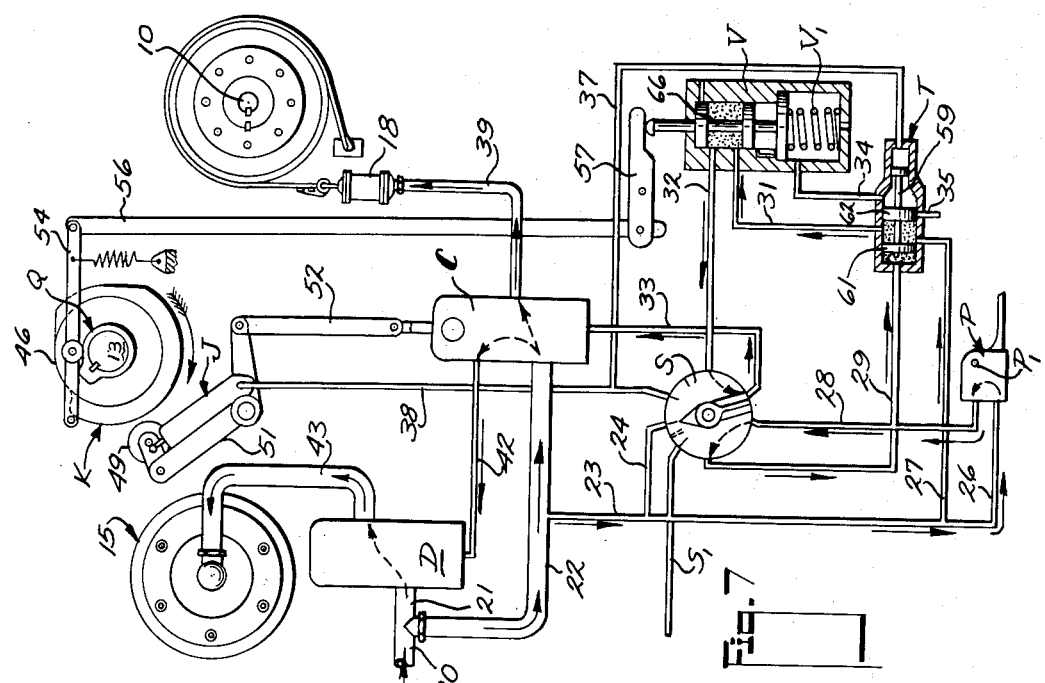
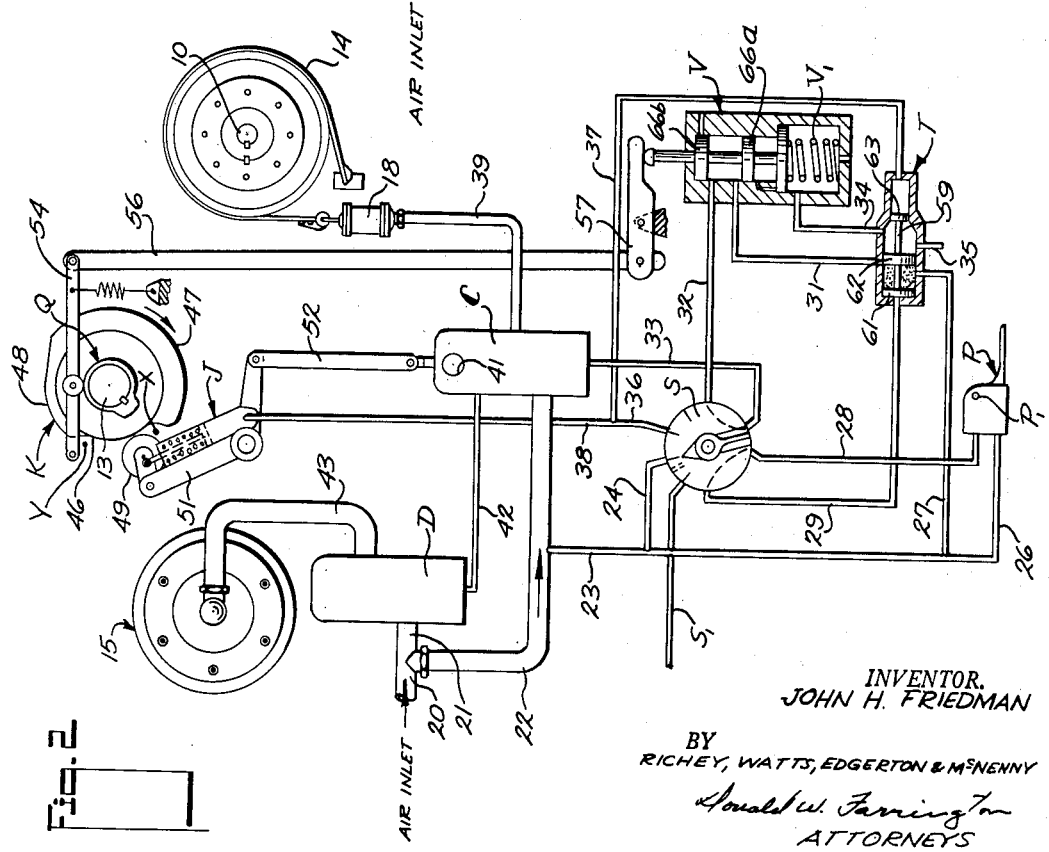
INVENTOR.
JOHN H. FRIEDMAN
BY
RICHEY, WATTS, EDGERTON & McNENNY
ATTORNEYS

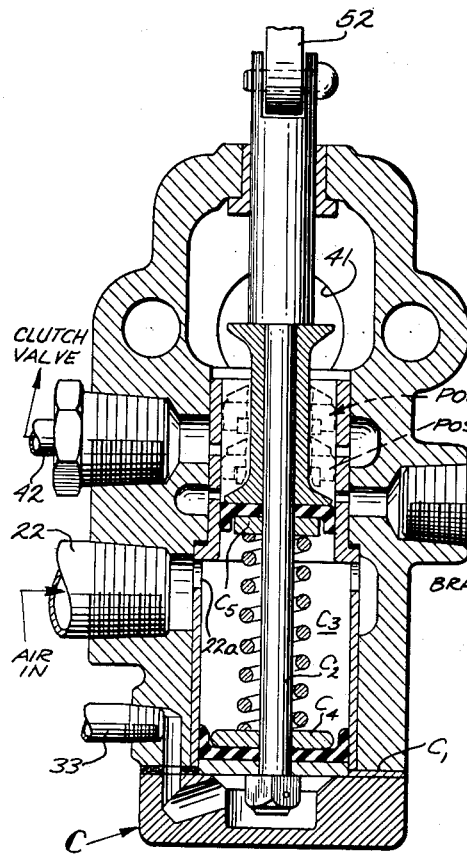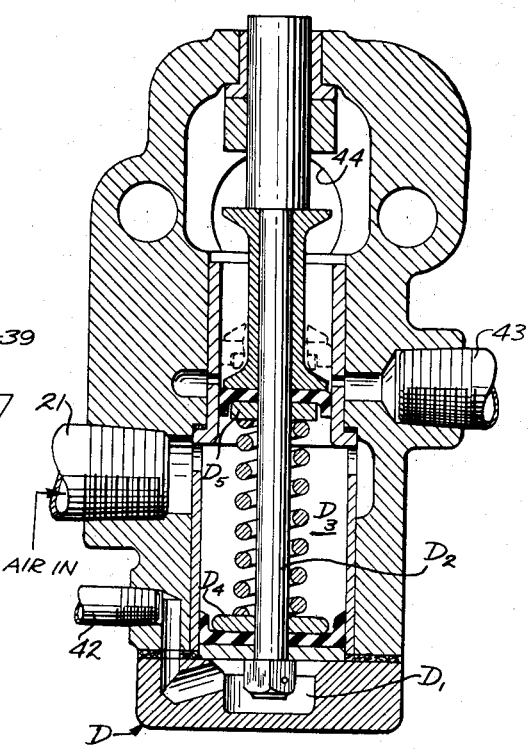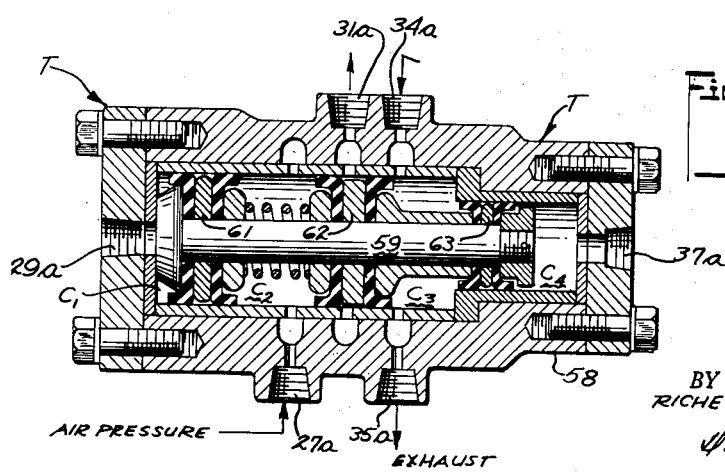

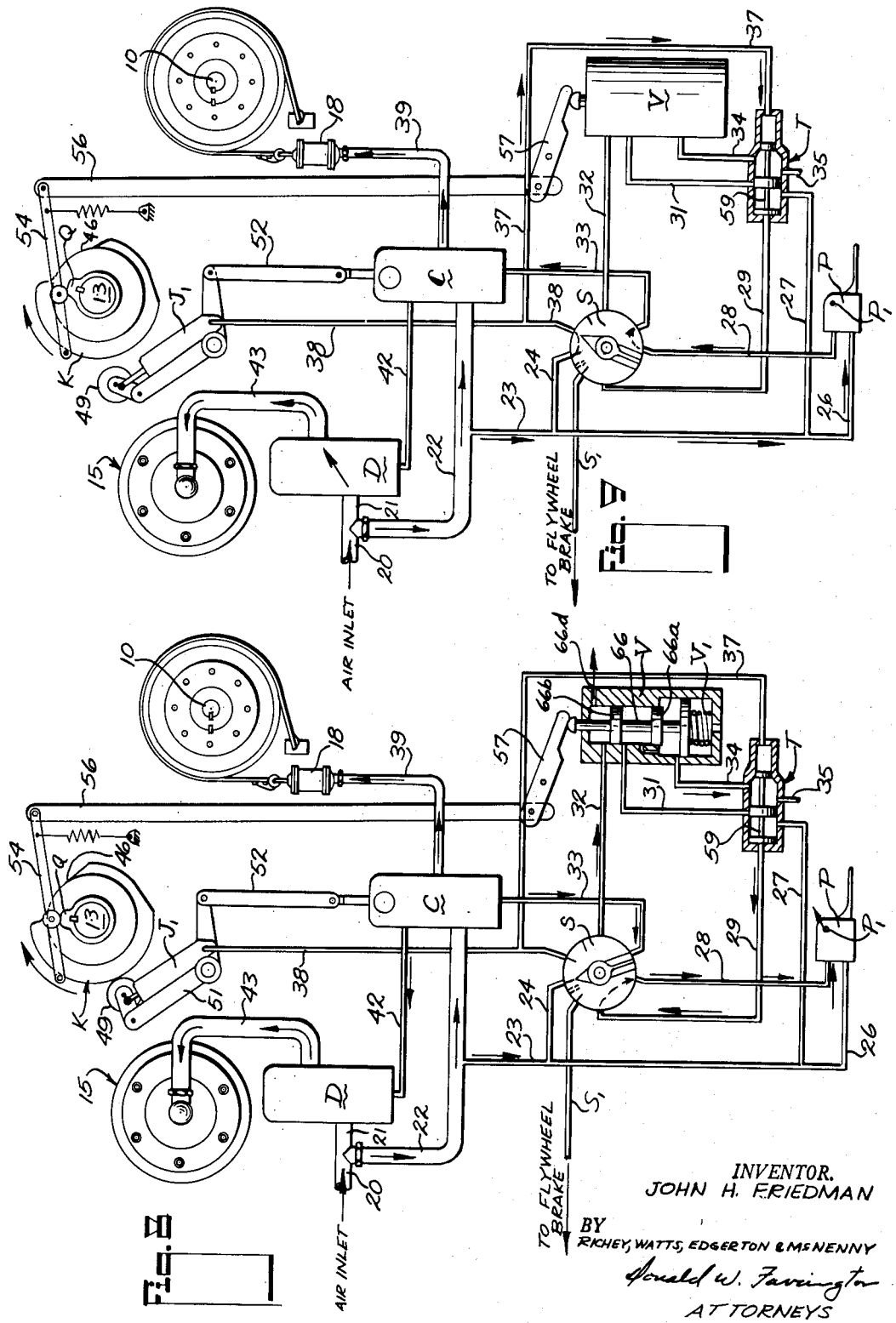

Oct. 4, 1955  J. H. FRIEDMAN  2,719,618
FLUID PRESSURE CONTROL APPARATUS FOR METAL WORKING MACHINES
Filed Sept. 19, 1952  5 Sheets-Sheet 5
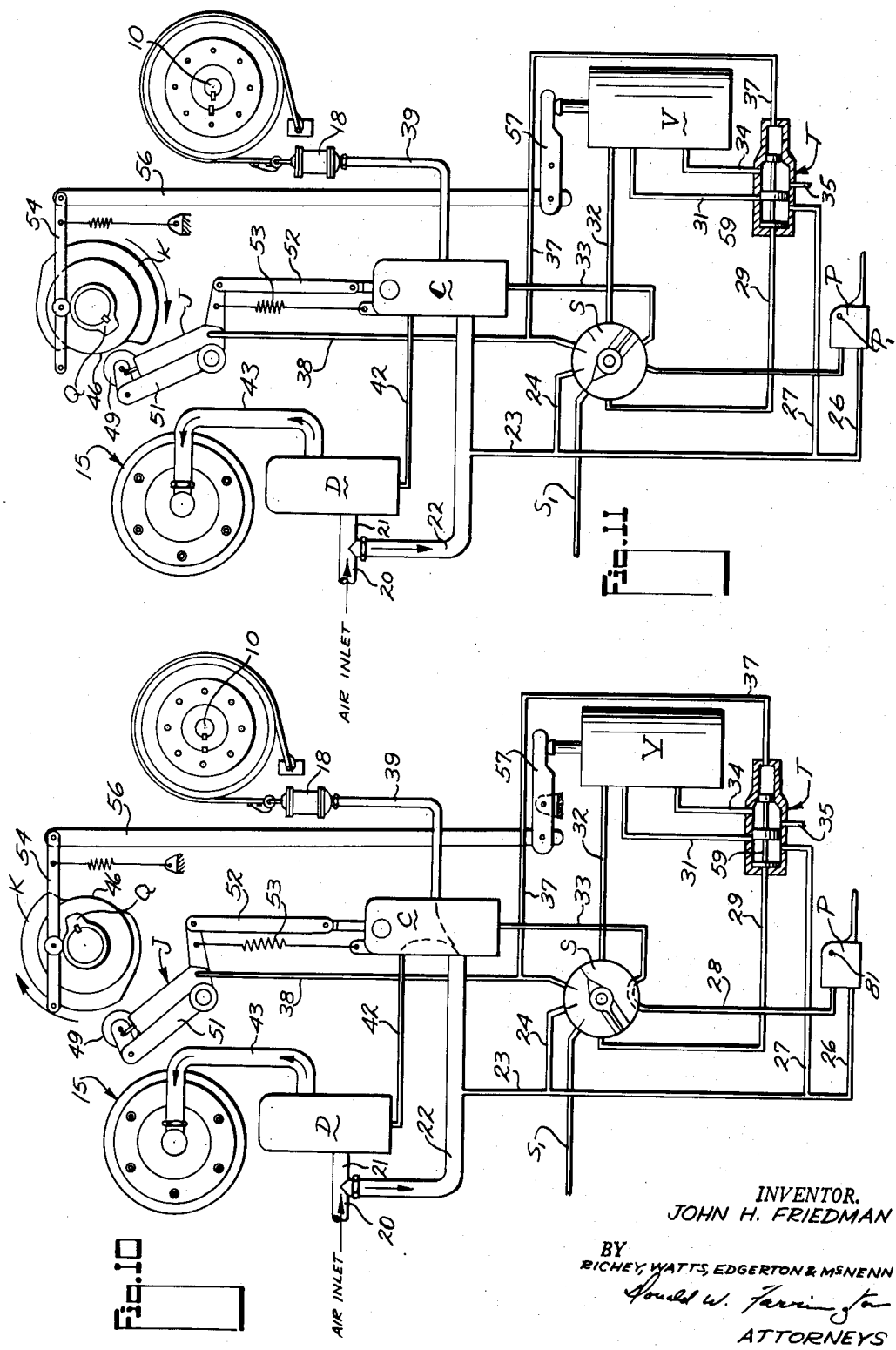
INVENTOR.
JOHN H. FRIEDMAN
BY
RICHEY, WATTS, EDGERTON & McNENNY
ATTORNEYS

United States Patent Office 2,719,618
Patented Oct. 4, 1955

2,719,618

FLUID PRESSURE CONTROL APPARATUS FOR METAL WORKING MACHINES

John H. Friedman, Tiffin, Ohio, assignor to The National Machinery Company, Tiffin, Ohio, a corporation of Ohio Application September 19, 1952, Serial No. 310,462

12 Claims. (Cl. 192—12)

This invention relates to metal working machines and more particularly to apparatus for efficiently controlling the operation of a metal working machine such as a press.

The invention is disclosed as being embodied in a vertical type heavy duty press which is provided with a vertically reciprocating ram and wherein the press is operated in a cyclic one-revolution fashion with the ram brought to rest at top dead center position. In heavy duty presses currently being used by industry, the ram is set in motion by operation of a foot pedal depressed by the operator of the machine. The ram is provided with a die co-operating with a fixed bed frame die and a work piece is shaped between the dies during each cycle of the machine. The crankshaft which drives the ram is started and stopped by a clutch and brake respectively and the crankshaft is provided with a cam operatively connected to the clutch and brake so that the brake is maintained in disengaged position and the clutch is maintained in engaged position during the greater part of one revolution of the crank. Ordinarily the cam is provided with a low portion and a cam follower connected to the clutch and brake rides in the low portion of the cam when the clutch is disengaged and the brake is engaged so as to bring the machine to rest with ram in top dead center position. The cam follower is moved away from the low portion of the cam to disengage the brake and engage the clutch by the operator depressing the foot treadle and the apparatus is designed so that when the high portion of the cam engages the cam follower, the brake is maintained in its off position and the clutch is maintained in its on position so that the crank will complete about 360 degrees of motion and bring the ram to rest at top dead center position.

Since the clutch and brake include friction material surfaces and since the parts set in motion have considerable momentum, a considerable portion of the cam which controls the clutch and brake is required for the low area part of the cam corresponding generally to the top dead center position of the ram. Due to wear on the friction material of the clutch and brake, and due to temperature and humidity variations characteristic of friction clutches and brakes the ram may be arrested at different points on either side of exact top dead center position with the result that the cam follower may be near the start of the low area on the cam or near the end of the low area of the cam when the ram is brought to rest. If the cam follower is near the end of the low cam area, a momentary depression of a foot treadle will bring a high cam area into engagement with the cam follower so that the crankshaft will complete a full revolution and come to rest at top dead center position. On the other hand, if the cam follower is near the start of the low cam area, a momentary depresison of the foot treadle will permit the cam follower to return to a low cam area without completing the sequential release of the brake and complete engagement of the clutch. Such operation of the treadle is known in the art as "short treadle" operation, and the result is that the massive ram is started down toward the bed frame die by release of the brake without full clutch engagement. Under such "short treadle" operation, the ram coasts down due to gravity and engages the work piece forcibly and comes to rest at a down dead center position. As the ram engages the work piece in down dead center position the bed frame is stretched slightly (as in normal operation) and then contracts to bind the ram locked on the work piece in down dead center position. Due to the tremendous forces involved, it is difficult or impossible to retract the ram from its down dead center position, even though the brake is dismantled and the full force of a rotating flywheel is transmitted to the crankshaft through the clutch. To free the ram from a down dead center position locked on the work piece, is a costly and laborious operation often involving the cutting away of the dies, so as to relieve the load imposed on the ram in its down dead center position.

It is an object of the present invention to provide a control for a machine of the character described above which will eliminate the possibility of a "short treadle" operation.

It is a further object to provide a control according to the preceding object wherein a full revolution of the crank is insured by depression of the foot treadle without regard to the position of the cam follower with respect to the low area of the crankshaft cam.

It is a further object of the present invention to provide a control according to the preceding objects wherein the machine operation is initiated through means which maintains the brake disengaged and the clutch engaged after the foot treadle is released.

Other objects and advantages relating to efficiency, safety and flexibility will appear from the following description and the appended drawings wherein:

Fig. 1 is an elevation of a vertical press wherein the movement of the ram is controlled by apparatus according to the present invention.

Fig. 1a is an elevation with parts in section of the brake for the press.

Fig. 2 is a diagrammatic layout of control apparatus according to the present invention with the parts in position corresponding to top dead center position of the ram.

Fig. 3 is a sectional elevation of a treadle operated valve forming a part of the present invention.

Fig. 4 is a sectional elevation of a one shot valve, forming a part of the present invention.

Fig. 5 is a sectional elevation showing the details of a control valve effecting operation of the clutch and brake.

Fig. 6 is a sectional elevation of a clutch valve controlling the clutch operation.

Fig. 7 is a diagrammatic layout of the control apparatus showing the parts in tripped position and with the control of the press removed from the crankshaft cam.

Fig. 8 is a diagrammatic layout of the control apparatus showing the position of the control parts as the ram continues in motion and with the control of the press restored to the crankshaft cam.

Fig. 9 is a diagrammatic layout of the control apparatus showing the parts in the position maintained for jog control of the machine.

Fig. 10 is a diagrammatic showing of the control apparatus with the parts in position for continuous operation of the press, and Fig. 11 is a diagrammatic layout showing the parts arranged for operation of a flywheel brake for the press.

The press embodying the present invention is indicated in its entirety as at P and in Fig. 1 includes a vertically disposed bed frame having a transverse crankshaft 13 near the top of the frame, a back shaft 10 parallel to the crankshaft and a flywheel on the back shaft driven by motor M. The crankshaft 13 drives a vertically reciprocating ram (not shown) and the ram is provided with a die which co-operates with a bed frame die so as to shape a work piece between the dies on each reciprocation of the ram. The crankshaft is provided with a large gear 12 in mesh with a small pinion gear 11 (see Fig. 1a) which is keyed to the back shaft 10 and the back shaft 10 is intermittently rotated by an air clutch which couples the flywheel to the back shaft. The motion of the crankshaft 13 is arrested by a brake 14. It will be understood by reference to Fig. 1 and 1a that the brake is on the far side of the press as shown in Fig. 1 and that the clutch is on the forward side of the press as shown. The specific details of the clutch and brake form no essential part of the present invention and air actuated clutches for presses and air operated brakes for presses are currently used and well known in art. In the particular brake construction shown in Fig. 1a a heavy coil spring 16 is arranged in the housing 18 so as to urge the band brake into braking position. The piston 17 is arranged in the housing so as to compress the spring and release the brake when air-line pressure is admitted in the housing through air line 39. A foot treadle P is mounted near the base of the press in a position convenient for the operator and the press is set in motion by depression of the foot treadle which through means hereafter described in detail, effects sequential release of the brake and engagement of the clutch so that the shaft 13 begins to turn. The shaft 13 is provided with a cam indicated as at K which is arranged to engage a cam follower pivoted on the bed frame. The cam follower includes roller 49 and is designed to operate the controls so as to maintain a full revolution of the crankshaft after the press is once set in motion.

A control valve indicated as at C and shown in detail in Fig. 5 is arranged to direct fluid pressure in a sequential fashion so as to release the brake and then to the clutch so as to cause clutch engagement. The control valve C includes a chamber $C_1$ at the base thereof and a plunger $C_2$ mounted for vertical reciprocation in a chamber $C_3$. A piston $C_4$ is mounted at the bottom of the plunger $C_2$ and a piston $C_5$ in a smaller bore closes the top of the chamber $C_3$. Chamber $C_3$ has a port 22a admitting air-line pressure through line 22 and when the plunger is moved upward to position 2 as indicated in dotted lines, pressure from chamber $C_3$ is directed outwardly of the valve body into the brake line 39. The chamber $C_1$ is an actuating chamber and when air-line pressure is directed into the chamber $C_1$ the plunger $C_2$ is moved upwardly to the positions 2 and 3 as indicated in dotted lines. With the piston $C_5$ in the position 3 as indicated in the Fig. 5 air-line pressure from chamber $C_3$ is directed outwardly of the valve in the line 42 which leads to the clutch valve D. The plunger $C_2$ has connected at the top thereof a link 52 which is actuated by the cam follower 49 and the cam K on the crankshaft.

The clutch valve D illustrated in Fig. 6 includes a chamber $D_1$, a plunger $D_2$ arranged in chamber $D_3$. The plunger $D_3$ includes a piston $D_4$ and piston $D_5$ arranged and operated like the plunger and piston of the control valve C. It will be noted that when fluid pressure is admitted into chamber $D_1$ through line 42, the plunger $D_2$ is raised and air-line pressure in chamber $D_3$ is directed outwardly of the valve through line 43 so as to effect clutch engagement. Upon exhausting the air in chamber $D_1$ the plunger is lowered to the full line position shown and clutch air through line 43 is exhausted throug the valve body D through exhaust opening 44.

It will be observed that when air is exhausted from chamber $C_1$ of the control valve C and the plunger is returned to its full line position shown in Fig. 5, the air from the brake may be exhausted through line 39 and outwardly of the valve body through exhaust port 41.

A one shot valve indicated in its entirety as at V includes a plunger 66 urged in one direction within the valve body by spring $V_1$ (see Fig. 4). The plunger 66 carries spaced pistons 66a and 66b providing a chamber 66c between the pistons and an inlet line 31 is provided to admit air under pressure to the chamber 66c, an outlet line 32 is provided and when the plunger 66 is urged upwardly by the spring $V_1$, fluid pressure from the chamber 66c is directed outwardly of the valve through line 32. An exhaust port 66d is provided above the piston 66b. When the plunger is moved downwardly by member 57 and the spring $V_1$ is compressed, the outlet 32 is closed with respect to the chamber 66c. As will be understood as the description proceeds, the one shot valve is normally urged by the spring $V_1$ to a position so as to conduct fluid pressure through the valve in by way of conduit 31 and out by way of conduit 32 and that such condition is maintained until the one shot valve is depressed by member 57.

The selector valve indicated in its entirety as at S comprises a manually operated plug valve having 6 pipe connections thereto and being rotatable so as to connect various of the pipes to each other. The specific details of the selector valve form no essential part of the present invention and it will be understood that other types of valves arranged to effect the connections here described, may be used. In Fig. 2 the selector valve is shown in the normal operating position for a cyclic one revolution operation of the crankshaft. This same position of the selector valve is retained in the diagrams of Figs. 7 and 8. In Fig. 9 the selector valve is shown in position maintained for jog operation of the press. In Fig. 10 the selector valve is shown in position for continuous operation and in Fig. 11 for operation of a flywheel brake.

To control the operations of the press after the initial actuation of the control valve C by the foot treadle P, cam K is provided with a low cam area which is the minimum diameter area indicated at 46. The cam K also includes an intermediate cam area indicated at 48 and which corresponds to a clutch release position as the crankshaft brings the ram to a top dead center position. The high cam area indicated at 47 is the maximum diameter of the cam and corresponds to full clutch engagement and full brake disengagement positions. As indicated in Fig. 2 the cam follower 49 may be brought into engagement with the low cam area with the ram at top dead center position at the start of the low cam area indicated at Y or near the end of the low cam area indicated at X. In the event the crankshaft is brought to rest with the cam follower 49 near the point indicated at Y in Fig. 2 the operation of the one shot valve and the related mechanism is such that the clutch will be maintained in engagement and the brake maintained in disengaged position until the high cam area 47 is brought into engagement with the cam follower. This insures against the "short treadle" operation referred to above.

Upon actuation of the foot treadle P by the operator, air at line pressure is directed through the treadle P in the line 28 leading to the selector valve S (see Fig. 7). The line pressure from line 28 is directed outwardly of the selector valve through the line 29 to the treadle valve T so as to move the plunger of the treadle valve T towards the right. As the plunger is moved to the right within the valve T air at line pressure is admitted to the valve T in the space between the pistons 61 and 62 and thence outwardly of the valve T through the line 31 to the one shot valve V. The position of the plunger in the one shot valve V is such that line pressure admitted in line 31 is directed outwardly of the valve V through line 32 and thence through the selector valve S through line 33 to the control valve C. The admission of line pressure in the control valve C, disengages the brake and engages the clutch as heretofore described. It will be observed that as long as the one shot valve V is in the position shown in Fig. 7, the control valve C is actuated irrespective of the period of time during which the treadle valve P remains depressed. Thus a single momentary depression of the treadle valve P places the control apparatus in the position shown in Fig. 7 without regard as to where the cam follower 49 may be on the low cam area 46.

A second cam Q is fixed to the crankshaft 13 which operatively engages the cam roller carried on a pivoted arm 54 which is pivotally connected to a vertically disposed link 56 operatively connected to a pivoted member 57 which engages the projecting end of the plunger 66 of the one shot valve. In Fig. 7 the high point of the cam Q is shown as approaching the cam follower on arm 54 and in Fig. 8 the high point of the cam Q is shown as raising the arm 54 to effect downward movement of the plunger 66 of the one shot valve. At the time the plunger 66 of the one shot valve is being depressed the high area of the cam K has advanced considerably with respect to the cam follower 49 so that the control of the press is returned to the cam K after the plunger of the one shot valve has been depressed. Movement of the plunger 66 downwardly in the one shot valve permits line 32 and line 33 connected thereto to be exhausted through the valve V through exhaust port 66d. Downward movement of the plunger 66 moves the lower piston 66a downwardly so as to exhaust the chamber between the pistons through line 34 leading to the treadle valve T. Since after treadle actuation the line 28 has been exhausted through exhaust port P₁ of the treadle P, line 29 connected thereto is exhausted and thus the admission of air from valve V into the treadle valve T through line 34 moves the plunger 59 of the treadle valve to the left as shown in Fig. 8. The treadle valve T is thus restored to starting position shown in Fig. 2 and is ready for the next cycle. Similarly when the cam Q has advanced slightly beyond the position shown in Fig. 8 the one shot valve V is restored to starting position by the spring V₁ and is ready for the next cycle. The exhaust of line 33 through line 32 and the one shot valve permits the control valve C to be restored to its starting position as shown in Fig. 5 as soon as the control link 52 is lowered by reason of the cam follower 49 moving on to the low cam area 46. Thus it will be observed that any depression of the foot treadle by the operator with the selector valve in the position shown in Figs. 2, 7 and 8 will insure a complete cycle of operation, will prevent a possibility of short treadle operation and will bring the crankshaft to rest with the ram at top dead center position.

In setting up the press for use and adjusting the dies, it is desirable to control the press through very limited movements of the ram and such control is termed a "jog" control. It will be understood that to "jog" the press the ram is advanced in limited short steps toward the bed frame dies by starting and stopping the machine, and that the operator observes the approach of the ram to the bed frame dies to insure that a work piece will be properly formed between the dies on each stroke and that the bed frame die will not be damaged by the ram die. To effect a jog control of the press according to the present invention, the selector valve S is manually turned to the position shown in Fig. 9 where line 24 is connected to line 38 at the selector valve so as to direct air pressure to the jog cylinder J.

The jog cylinder J is a small air cylinder operatively connected to the support for the cam follower 49, and when the cylinder J is actuated, the cam follower 49 is moved out of the path of the cam K with the result that the cam K has no operative effect upon the control valve C. The selector valve S when in jog position also connects line 28 to line 33 leading to the control valve C. Since all the conduits leading to the one shot valve V and the treadle valve T are thus blocked by the selector valve, the one shot valve and its operating mechanism is isolated from the cam control when in jog position. The operator by actuation of the treadle P may intermittently advance the ram so as to effect any desired amount of crankshaft rotation. Each time the treadle P is depressed the brake is released and the clutch is engaged as long as air under pressure is being introduced through line 33. The control valve C is returned to its starting position by pressure differentials when the treadle is operated so that lines 33 and 28 are exhausted through the treadle exhaust port as at P₁.

For continuous press operation as distinguished from jog control the selector valve S may be turned to the position shown in Fig. 10. The selector valve establishes communication between lines 28 and 33 so that the sole control of the press is through the line 33 to the control valve C. Since the jog cylinder J is not actuated the press will come to rest each time with the cam follower 49 in the low cam area 46. Thus the press may be continuously driven by depressing the treadle and whenever the treadle is released by the operator, the press will stop when the ram reaches top dead center position.

The selector valve S may also be employed to direct air to a flywheel brake. This operation of the selector valve is illustrated in Fig. 11 where it will be noted that the selector valve establishes a line directing air pressure from line 24 to line S₁ which leads to a flywheel brake. As will be understood by those skilled in the art, the flywheel is continuously driven by the motor M and that the clutch when actuated couples the flywheel to shaft 10. With the selector valve S in the position shown in Fig. 11 all of the control lines leading to the treadle, one shot valve V, treadle valve T, control valve C, and jog cylinder J, are isolated with respect to the air-line pressure. This means that with the selector valve in the position shown in Fig. 11, the press is idle and the sole function of the selector valve is to direct air to a flywheel brake. The specific details of the brake for the flywheel form no essential part of the present invention and may be of the band brake type or of a disk type operated by an air actuated diagram.

Although I have illustrated and described one form of my invention in considerable detail, it will be appreciated by those skilled in the art that numerous modifications may be made thereon without departing from the scope of the invention as defined in the following claims.

What is claimed is:

1. Control apparatus for a metal working machine having a crankshaft, a ram driven by the crankshaft, a clutch and brake, a cam on the crankshaft, a foot treadle, a fluid actuated control valve for the clutch and brake, said cam having high and low areas, means engaging said cam operatively connected to said control valve to move the same and effect disengagement of the clutch and engagement of the brake as the cam turns from a high cam area to a low cam area with respect to said means to stop the ram at its top dead center position, and means to start crank rotation including a one shot valve operatively connected to said control valve and said treadle to open said one shot valve to direct fluid pressure to said control valve and thereby maintain the brake in disengaged position and the clutch in engaged position as the cam turns through said low cam area and moves a high cam area into operative position with respect to said first named means.

2. Control apparatus for a metal working machine having a crankshaft, a ram driven by the crankshaft, a fluid pressure actuated clutch and brake, a cam fixed to the crankshaft, a manually operated foot treadle, a fluid actuated control valve for sequential operation of the clutch and brake, said cam having high and low areas, cam follower means engaging said cam operatively connected to said control valve to move the same and effect sequential disengagement of the clutch and engagement of the brake as the cam turns from a high cam area to a low cam area with respect to said cam follower means to stop the ram at its top dead center position, and means to start crank rotation in response to foot treadle operation including a one shot valve operatively connected to said control valve and said treadle to move said one shot valve to direct fluid pressure to said control valve and thereby maintain the brake in disengaged position and the clutch in engaged position as the cam turns through said low cam area and moves a high cam area into operative position with respect to said cam follower means.

3. Control apparatus for a vertical press having a crankshaft, a reciprocating ram driven by the crankshaft, a fluid operated clutch and brake, a cam on the crankshaft, a manually operated foot treadle, a fluid actuated control valve for sequentially directing fluid pressure to the clutch and brake, said cam having a high area for clutch engagement and brake release and a low area for clutch release and brake engagement, means engaging said cam operatively connected to said control valve to move the same and effect disengagement of the clutch and engagement of the brake as the cam turns from a high cam area to a low cam area with respect to said means to stop the ram at its top dead center position, and means to start crank rotation upon treadle operation including a one shot valve operatively connected to said control valve and said treadle to open said one shot valve to direct fluid pressure to said control valve and thereby maintain the brake in disengaged position and the clutch in engaged position as the cam turns through said low cam area and moves a high cam area into operative position with respect to said first named means.

4. Control apparatus for a press having a crankshaft and ram driven by the crankshaft, a clutch to couple said crank shaft to a motor and a brake to restrain crankshaft rotation, a manually operated foot treadle, a fluid actuated control valve to sequentially release the brake and engage the clutch, a cam fixed to the crankshaft having high and low areas, cam follower means engaging the cam operatively connected to said control valve to release the clutch and engage the brake as the cam turns from a high cam area to a low cam area with respect to said cam follower means to stop the ram at its top center position, means to initiate crank rotation including a one shot valve operatively connected to said control valve and to said treadle to move said one shot valve to open position and direct fluid pressure to said control valve whereby the brake is maintained in released position and the clutch in its engaged position as the cam turns through a low cam area and moves a high cam area into operative position with respect to said cam follower means and a second cam on said shaft operatively connected to said one shot valve to close said one shot valve and return the control of said clutch and brake to said first named cam.

5. Control apparatus for a press having a crankshaft and ram driven by the crankshaft, a fluid pressure actuated clutch to couple said crankshaft to power means and a fluid pressure actuated brake to restrain crankshaft rotation, a manually operated treadle, a fluid actuated control valve to sequentially release the brake and engage the clutch, a cam fixed to the crankshaft having high and low areas, cam follower means engaging the cam, a link operatively connected to said control valve and cam follower means to release the clutch and engage the brake as the cam turns from a high cam area to a low cam area with respect to said cam follower means to stop the ram at its top center position, means to initiate crank rotation in response to treadle operation including a one shot valve operatively connected to said control valve, a treadle valve connected to said one shot valve and to said treadle to move said one shot valve to open position and direct fluid pressure to said control valve whereby the brake is maintained in released position and the clutch in its engaged position as the cam turns through a low cam area and moves a high cam area into operative position with respect to said cam follower means and a second cam on said shaft operatively connected to said one shot valve to close said one shot valve and return the control of said clutch and brake to said first named cam.

6. Control apparatus for a press having a crankshaft and ram driven by the crankshaft, a driving motor, a clutch to couple said crankshaft to said motor and a brake to restrain crankshaft rotation, a manually operated foot treadle, a fluid actuated control valve to sequentially release the brake and engage the clutch, a cam fixed to the crankshaft having high and low cam areas, cam follower means engaging the cam operatively connected to said control valve to release the clutch and engage the brake as the cam turns from a high cam area to a low cam area with respect to said cam follower means to stop the ram at its top center position, means to initiate crank rotation including a one shot valve operatively connected to said control valve, a fluid pressure actuated treadle valve to direct fluid pressure to said one shot valve connected to said treadle, means to move said one shot valve to open position and direct fluid pressure from the said treadle valve to said control valve whereby the brake is maintained in released position and the clutch in its engaged position as the cam turns through a low cam area and moves a high cam area into operative position with respect to said cam follower means, a second cam on said shaft operatively connected to said one shot valve to close said one shot valve, exhaust said control valve and return the control of said clutch and brake to said first named cam.

7. Control apparatus for a press having a crankshaft and a vertically reciprocating ram driven by the crankshaft, a pair of cams fixed to the crankshaft, each of said cams having high and low areas, the high area of one cam being displaced angularly with respect to the high area of the other cam, a control valve for a clutch and brake, a cam follower operatively connected to said control valve and said other cam, a one shot valve operatively connected to said control valve, a cam follower operatively engaging said one cam and connected to said one shot valve, treadle means to initiate rotation of the crankshaft through said control valve and actuate said one shot valve to maintain crank rotation until the high point on said one cam effects movement of said one shot valve.

8. Control apparatus for a press having a crankshaft and a vertically reciprocating ram driven by the crankshaft, a main control cam fixed to the crankshaft, a secondary control cam fixed to the crankshaft, each of said cams having high and low areas with the high area of the main cam being displaced angularly with respect to the high area of the secondary cam, a control valve for a clutch and brake, a cam follower operatively connected to said control valve and said main cam, a one shot valve operatively connected to said control valve, a cam follower operatively engaging said secondary cam and connected to said one shot valve, foot treadle means to initiate rotation of the crankshaft through said control valve and said one shot valve to maintain crank rotation until the high point on said secondary cam effects movement of said one shot valve.

9. Control apparatus for a press having a crankshaft and a vertically reciprocating ram driven by the crankshaft, main and secondary cams fixed to the crankshaft, each of said cams having high and low areas with the high area of the main cam being displaced angularly with respect to the high area of the secondary cam, a control valve for a clutch and brake, a cam follower operatively connected to said control valve and said main cam, a normally open one shot valve operatively connected to said control valve to direct fluid pressure to the control valve, a cam follower operatively engaging said secondary cam and connected to said one shot valve, foot treadle means to initiate rotation of the crank shaft through said one shot valve and control valve to maintain crank rotation until the high point on said secondary cam effects closing movement of said one shot valve.

10. Control apparatus for a vertical press, said press having a bed frame and a crankshaft mounted transversely of the bed frame near the top of the frame, a back shaft parallel to said crankshaft and geared to the crankshaft, a motor driven flywheel on the back shaft and a fluid pressure operated clutch to couple the flywheel to the back shaft, a fluid pressure operated brake for the back shaft, a control valve actuatable by fluid pressure to sequentially release the brake and engage the clutch, a cam on the crankshaft operatively connected to said control valve to sequentially disengage the clutch and engage the brake, means to introduce fluid pressure to said control valve including a one shot valve, a second cam on said crankshaft and means operatively connecting said second cam and said one shot valve whereby fluid pressure is maintained in said control valve until said second cam has moved said one shot valve to interrupt the fluid pressure line through said one shot valve.

11. Control apparatus for a vertical press, said press having a bed frame, a crankshaft mounted transversely of the bed frame near the top of the frame, a back shaft parallel to said crankshaft and geared to the crankshaft, a motor driven flywheel on the back shaft and a fluid pressure operated clutch to couple the flywheel to the back shaft, a fluid pressure operated brake for the back shaft, a control valve actuatable by fluid pressure to sequentially direct fluid pressure to the brake and clutch to release the brake and engage the clutch, a main cam on the crankshaft operatively connected to said control valve to sequentially disengage the clutch and engage the brake, means to introduce fluid pressure to said control valve including a normally open one shot valve, a secondary cam on said crankshaft and means operatively connecting said secondary cam and said one shot valve whereby fluid pressure is maintained in said control valve until said secondary cam has closed said one shot valve to interrupt the fluid pressure flow through said one shot valve, and a fluid pressure operated treadle valve movable to direct fluid pressure to said one shot valve.

12. Control apparatus for a press, said press having a vertically disposed bed frame and a crankshaft mounted transversely of the bed frame near the top of the bed frame, a back shaft parallel to said crankshaft and geared to the crankshaft, a motor driven flywheel on the back shaft, a fluid pressure operated clutch to couple the flywheel to the back shaft, a fluid pressure operated brake for the back shaft, a control valve actuatable by fluid pressure to sequentially operate the brake and clutch, a cam on the crankshaft operatively connected to said control valve to sequentially disengage the clutch and engage the brake, means to introduce fluid pressure to said control valve including a normally open one shot valve, a secondary cam on said crankshaft, means operatively engaging said secondary cam and said one shot valve, a treadle valve connected to said one shot valve whereby fluid pressure is maintained in said control valve by said one shot valve until said secondary cam has moved said one shot valve to interrupt the fluid pressure line through said one shot valve, and a foot treadle connected to said treadle valve to direct fluid pressure thereto to open the treadle valve to line pressure leading to the said one shot valve.

References Cited in the file of this patent

UNITED STATES PATENTS

| | | |
|---|---|---|
| 1,869,085 | Williamson | July 26, 1932 |
| 2,217,332 | Criley | Oct. 8, 1940 |